United States Patent
Harnett

(10) Patent No.: US 6,407,752 B1
(45) Date of Patent: Jun. 18, 2002

(54) METHOD AND SYSTEM FOR A USER INTERFACE FOR REMOTE FTP HOSTS

(75) Inventor: Sheila Anne Harnett, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/841,220

(22) Filed: Apr. 29, 1997

(51) Int. Cl.[7] .................................................. G06F 3/00
(52) U.S. Cl. ........................ 345/744; 345/835; 345/733; 709/227
(58) Field of Search .................................. 345/333, 334, 345/335, 339, 733, 762, 765, 744, 764, 781; 395/200.3, 200.6, 703; 709/223, 227, 224, 246

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,553,083 A | 9/1996 | Miller | |
| 5,835,089 A * | 11/1998 | Skarbo et al. | 345/335 |
| 5,872,977 A * | 2/1999 | Thompson | 395/703 |
| 5,880,730 A * | 3/1999 | Durand | 345/335 |
| 6,094,684 A * | 2/2000 | Paumann | 709/227 |

* cited by examiner

Primary Examiner—Raymond J. Bayerl
Assistant Examiner—Cao H. Nguyen
(74) Attorney, Agent, or Firm—Sawyer Law Group LLP; Leslie A. Van Leeuwen

(57) ABSTRACT

The present invention provides a method and system for utilizing a Desktop user interface to access remote FTP hosts. The present invention is intended to eliminate the context switch between user interface metaphors when users want to utilize FTP and its associated file transfer functionality to access data on remote filed systems. A method and system in accordance for allowing a remote host using a user interface of a processing system comprising the steps of identifying a plurality of programming interface operations for the remote host and mapping a user interface code to the programming interface operations to allow for the user interface to be utilized when accessing the remote host The system and method in accordance with the present invention maps the FTP command line operations to iterations on and between objects that are already present in a user interface metaphor of the operating system of a computer system. In so doing, the FTP host appears to be an extension of the computer system.

31 Claims, 6 Drawing Sheets

METHOD AND SYSTEM FOR A USER INTERFACE FOR REMOTE FTP HOSTS

FIELD OF THE INVENTION

The present invention relates generally to a method and system for accessing information in remote hosts and more particularly a system for utilizing a user interface to access remote Hosts.

BACKGROUND OF THE INVENTION

The prevalence of the Internet in the arena of desktop computing and desktop operating systems has resulted in everyday use of utilities like File Transfer Protocol (FTP)-based tools that Transmission Control Protocol/Internet Protocol (TCP/IP) enables. However using existing FTP-based utilities means that the user has to make a mental context-switch between operating within the metaphor presented by the Desktop user interface, and that of the utility.

A representative conventional method of addressing this issue is FTP-PM, which is an OS/2 Presentation Manager based utility for FTP. However, it does not allow drag drop operations between the application and the desktop, nor does it attempt to represent itself as an extension of the desktop user interface metaphor. It shows files on the remote host as names in a list box. It still requires the user to make a context switch between using the desktop user interface and the utility. Accordingly, the user must leave the desktop user interface metaphor of drag/drop, context menus, folders, etc., and must resort to the command line to use FTP, or drop down to a PM application that wraps operation provided by the FTP command line. In addition, conventional methods for FTP user interfaces do not integrate with the Desktop user interface, and therefore do not offer as many operations and settings to the user as does the present invention.

In most systems in which there is access to a remote FTP host, there is typically very little consistency between the different operating systems running on the remote hosts. As has been above mentioned in these arrangements, a command line has to be opened, a password has to be provided, and a significant amount of knowledge of the file system of the particular host has to be known before a user can adequately access the data in such a system.

Accordingly, what is needed is a method and system for providing a user interface in which a consistent metaphor can be used to access data within heterogeneous remote FTP hosts. Such a system should be easy to use, and should be transparent in operation to the user. The present invention addresses such a need.

SUMMARY OF THE INVENTION

The present invention provides a method and system for utilizing an operating system's desktop user interface to access programs and data residing on remote hosts which make use of different file systems and operating systems. The present invention is intended to eliminate the context switch between user interface metaphors when users want to utilize FTP and its associated file transfer functionality.

A method and system in accordance with the present invention for allowing access to a remote host using a user interface of a processing system comprises identifying a plurality of programming interface operations for the remote host and then mapping the user interface code to the programming interface operations to allow for the user interface to be utilized when accessing the remote host.

The system and method in accordance with the present invention maps the FTP command line operations to menu-driven or direct manipulation operations on and between objects that are already present in a user interface metaphor of the desktop operating system. In so doing, an FTP host's file system and its contents appear to be an extension of the computer system and its user interface an extension of the desktop user interface. The present invention provides a new type of object within a computer called an FTP Host Folder. An FTP Host folder can be created to access a remote FTP site, to view files at that FTP site, to navigate directories at that site, to transfer files between the local machine and the remote host, or to transfer files directly between two remote hosts. In a preferred embodiment, low level FTP operations such as login, cd, get, put, mget, mput, ASCII, binary, etc., have been mapped to operations of the already defined Desktop User Interface. For example, in the Workplace Shell on the OS/2 operating system, the FTP operations have been mapped to menu-driven or direct manipulation operations of the FTP Host folder objects.

DESCRIPTION OF THE INVENTION

The present invention relates to a system and method for utilizing a user interface to access remote hosts. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention allows a user to seamlessly view and manipulate data and programs on remote FTP hosts via a Desktop user interface by mapping a user interface code to a lower level code. Accordingly, the programming interface of a new type of object called a FTP Host Folder is utilized to provide this mapping. To more particularly describe this feature of the present invention, refer now to the accompanying discussion in conjunction with the following figures.

Figure 1:
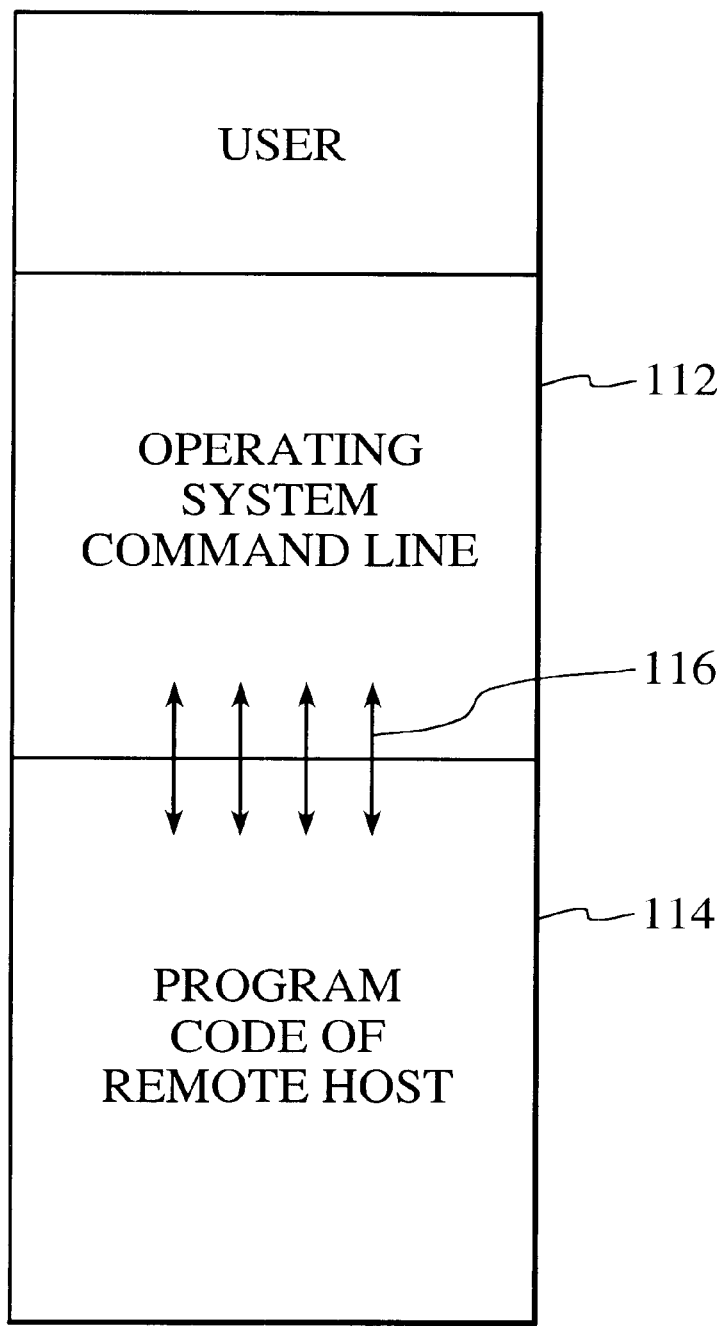
FIG. 1 is a diagram that shows a typical configuration in which a user must interact with a low level command line interface in order to access a remote host.

FIG. 1 is a diagram that shows a typical configuration in which a user must interact with a low level command line interface in order to access a remote host. As is seen, the user must interact directly with the command line interface code or have knowledge of the FTP command set to access that particular remote host. In so doing, command line and FTP details must be known to adequately interface therewith.

Accordingly, the user must have intimate knowledge of specific details about the particular programming interfaces 16 that is to be accessed. In so doing, it becomes complicated and difficult for a typical user to access such information. The present invention allows for a typical user to be able to use Desktop user interface metaphors such as drag and drop, double click and other metaphors, to access, view and manipulate data on the remote host.

Figure 2:
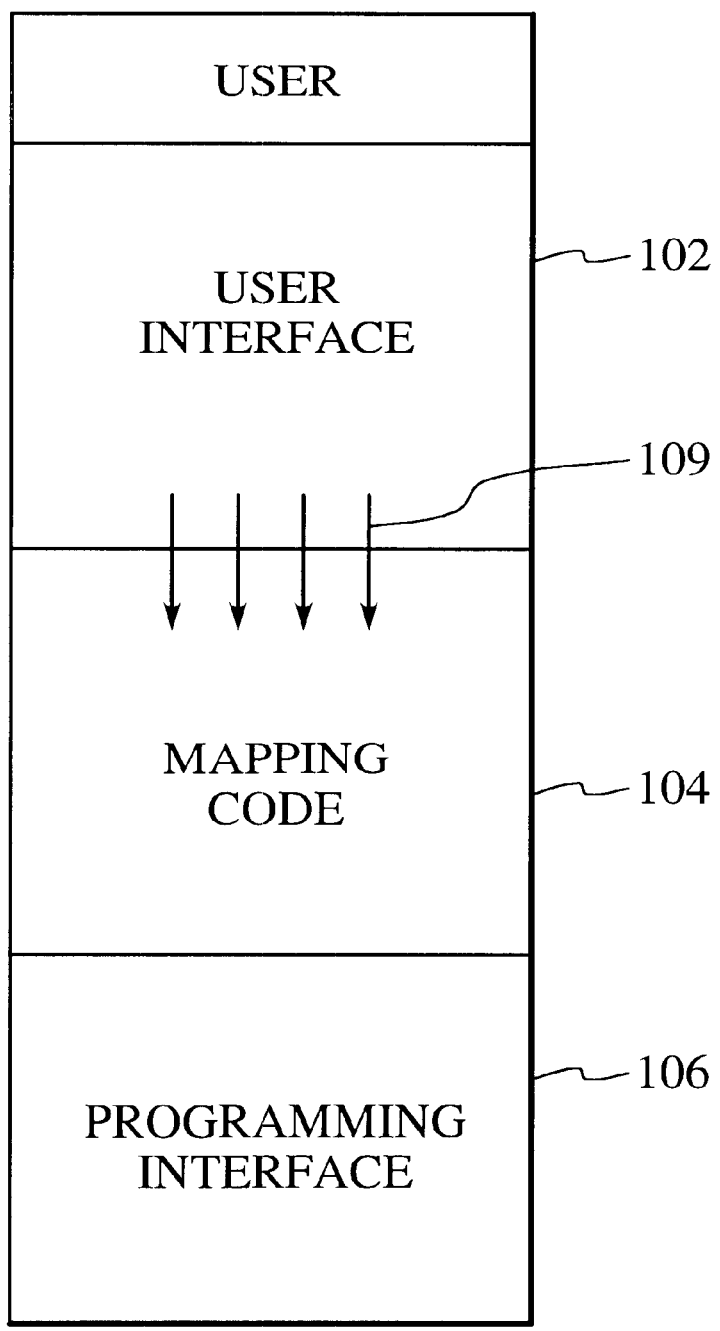
FIG. 2 is a diagram that shows a configuration of user interface code with program interface code in accordance with the present invention.

To more clearly describe this system, refer now to FIG. 2. FIG. 2 is a diagram that shows a configuration of user interface code with program interface code in accordance with the present invention. For example, in OS/2, a dynamic link library (DLL) implementing Workplace Shell UI objects is designated by 102, a programming logic DLL is designated by 104, and the FJPAPI DLL is designated by 106. As is seen, there is a mapping code 104 which is between the user interface code 102 and the programming interface code 100. This is accomplished by making use of the facilities of a programming interface that is resident within the programming interface code 100, and then mapping all the higher level operations from the mapping code 104 on top of the PI code 106. In so doing, this mapping code actually accesses the FTP-specific programming API input 108 and maps them to higher level user interface interactions, e.g., double click, open, pop up menu or drag a file from the user interface 106. In one embodiment, the user interface level code could be mapped into the lower level via a dynamic link library. However, one of ordinary skill in the art recognizes that there are many ways to map the lower level code into the higher level, and that mapping would be within the spirit and scope of the present invention.

The implementation of this invention on OS/2 consists of a DLL that implements the user interface and the program logic for several new kinds of user interface objects: FTP Host, FTP Host Folder and FTP Objects.

The class hierarchy below shows the inheritance of the classes used to implement this invention on OS/2:

| Existing Workplace Shell UI Classes | WPFolder | WPTransient |
|---|---|---|
| New FTP Host Classes | WPHost | WPFTPObj |
| WPHostFolder | WPFTPDir | WPFTPLink |
| Where: | represents a class | |
| | represents a subclass relationship | |

The UI of the new FTP Host classes is comprised by 102 in FIG. 2. The mapping/program logic is comprised by 104 in FIG. 2.

By providing this mapping function it is possible now to use all of the user interface interaction metaphors, for example, that are used in a typical windows-like environment to access a remote host and the files located therein.

To more specifically describe an embodiment for performing this function, refer now to the following discussion in conjunction with the associated figures.

Figure 3:
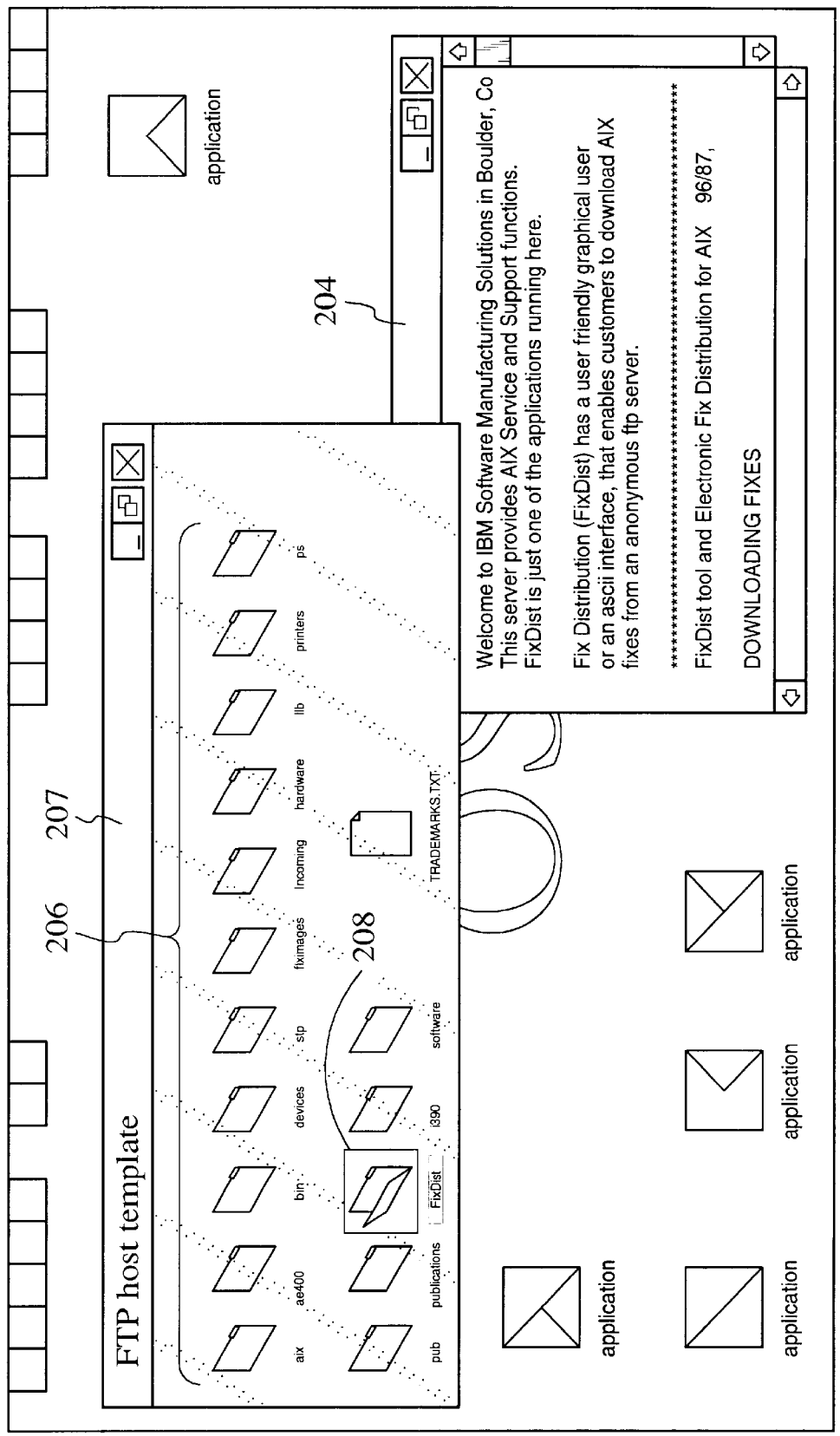
FIG. 3 shows an open FTP Host folder with a view of one of the remote files opened in a viewer on the local computer's system (in this case an OS/2 system editor).

FIG. 3 shows an open FTP Host folder 200 which is created by use of the mapping code of FIG. 2, with a view of one of the remote files 204 opened in a local computer's system editor (in this case an OS/2 system editor). The operation of accessing the host, downloading the remote file and opening the view is preferably accomplished by double clicking on the remote file is iconic representation.

FTP Host Folders 200

An FTP Host folder 200 can be created and used to access a remote FTP site, to view files at that FTP site, to navigate directories at that site, to transfer files between the local machine and the remote host, and to transfer files directly between two remote hosts. Operations such as login, cd, get, put, mget, mput, ASCII, binary, etc. can be built into the predefined Desktop UI's folder behaviors, so that the user need only be familiar with the Desktop user interface, not lower level concepts such as the FTP command set.

In this embodiment, an FTP Host folder's icon 208 changes state when the folder is opened and closed. The title of the folder can be initially set to its corresponding host name and user name but, once configured, can then be renamed.

Open views of an FTP Host (or one of its sub folders) are presented as folder views, like any other Desktop folder. To distinguish these views from those of folders that reside locally, a subtle background bitmap in the folder indicates that it is a view of an FTP Host directory.

One method for creating an FTP Host folder via the Desktop user interface is by dragging an FTP Host Template object 207 from the Templates for Internet folder and dropping it onto the desktop or any other folder. The folder can also be created by choosing "Create another" from the context menu of another FTP Host folder. A different FTP Host can be created for each host which is to be connected to, or a single FTP Host folder can be created that can be used to access different remote hosts each time. This flexibility is available in an FTP Host folder's Properties notebook.

Figure 4:
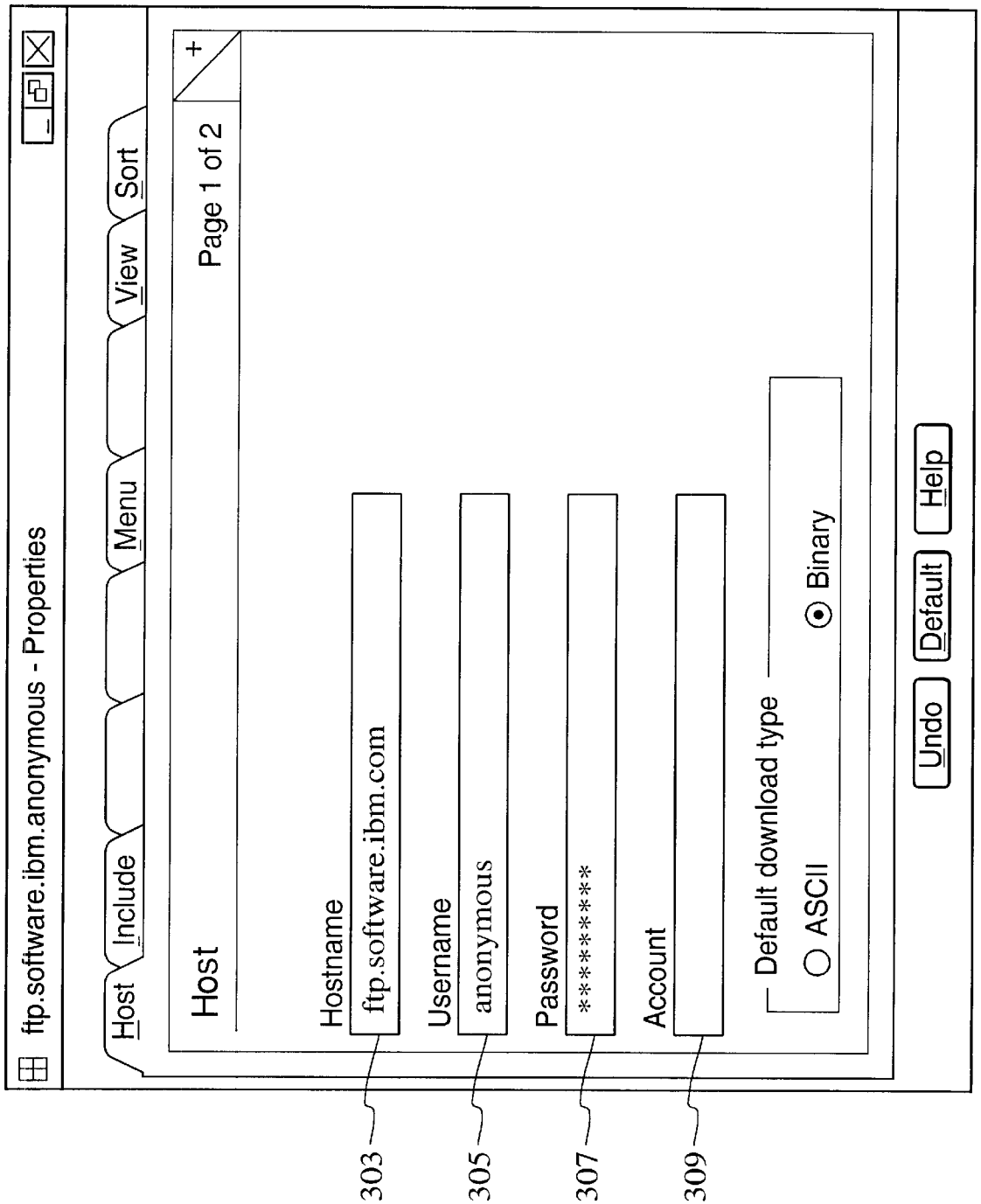
FIGS. 4 and 5 illustrate two pages of an FTP Host folder which displays the properties for a particular remote host (Properties notebooks are part of the Desktop user interface for objects.)
Figure 5:
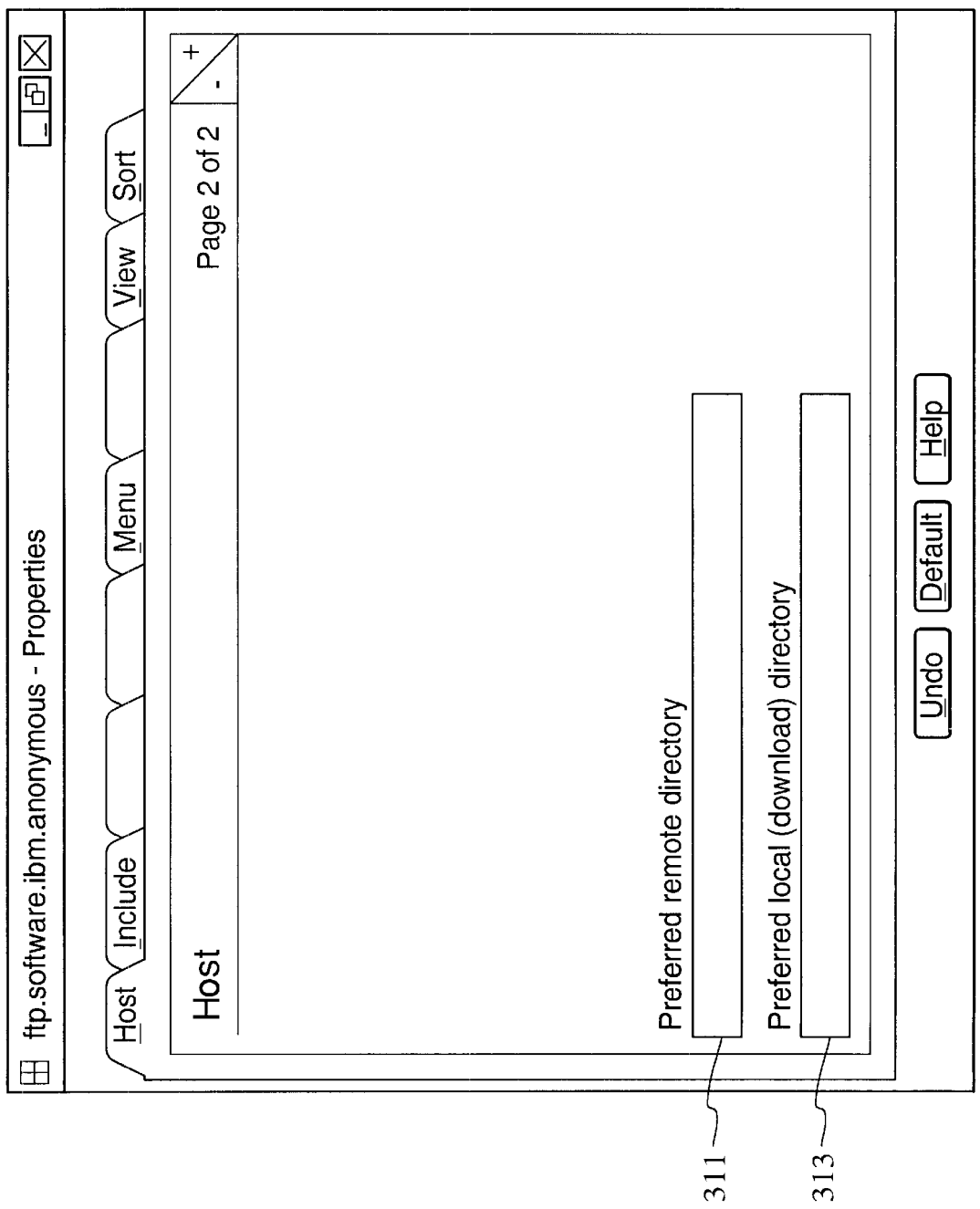

FIGS. 4 and 5 illustrate two of the properties notebook pages 302 and 304, respectively, for an FTP Host folder. FIG. 4 illustrates a properties notebook page 302 which includes a host name 303, a user name 305, password 307 and an account number 309. FIG. 5 illustrates a properties notebook page 304 which includes a preferred remote directory 311 and a preferred local directory 313. Properties notebook are part of the desktop user interface for objects. As is seen there are a plurality of values for hostname, username, password, etc. If any of these values are not specified when the FTP Host is opened, the user is prompted to enter the missing value(s), for example, hostname, username, password.

Other Settings in an FTP Host Folder

Other settings that can be configured in an FTP Host folder's Properties notebook are:

The initial remote directory to change to when the host is opened.

Default transfer type (binary or ASCII). This value can also be toggled from the FTP Host folder's popup menu.

The default local directory to which a remote file will be downloaded. This directory is used when no explicit target directory for a get operation is specified (e.g., when double-clicking on a remote file results in a get operation without an explicit target directory).

A file pattern filter that can be used to specify a file filter which determines which files will be included in a remote directory view.

Using an FTP Host Folder to Navigate and Perform File Transfers

Like any other folder on the desktop, an FTP Host folder can be opened by double-clicking on it with the mouse or by selecting "Open as" (in a tree view, icon view, or details view) from the FTP Host's popup menu. When the FTP Host is opened, it displays its remote contents in a folder view; the files and directories it contains are displayed as file and folder objects with their own context menus and properties.

The remote host's file system is navigated by opening subfolders to get to the desired remote directory, just as with any directory on the local machine. A remote file is viewed by double-clicking on it. In this case, the viewer in which the file is opened is the executable on the local machine that associates to the file's extension. For example, a remote bitmap (.BMP) file, when opened, is loaded into an image viewer on the local machine; a text (.TXT) file is loaded into the default editor on the local machine; and a wave (.WAV) file is loaded into an audio player on a local machine. This functionality allows for quickly viewing and sampling data files that reside on the remote host. The initial starting directory for the remote host can also be changed, which is used as the starting point for navigating that host, by editing the "Initial remote directory" field in its Properties notebook.

Alternately, a remote file can be opened by dragging it from an open view of a Host folder and dropping it onto a program object on the desktop that is to be used to view the file.

In addition, a remote file can be printed by dragging and dropping it onto a printer on the desktop.

In all these cases of viewing and printing a remote file, a "get" of the file is done transparently to the user. When this happens, if the user has not specified a default download directory in the FTP Host folder's Properties notebook, the directory specified by the TMP environment variable on the user's machine is used as the download directory for the transparent get operation.

Figure 6:
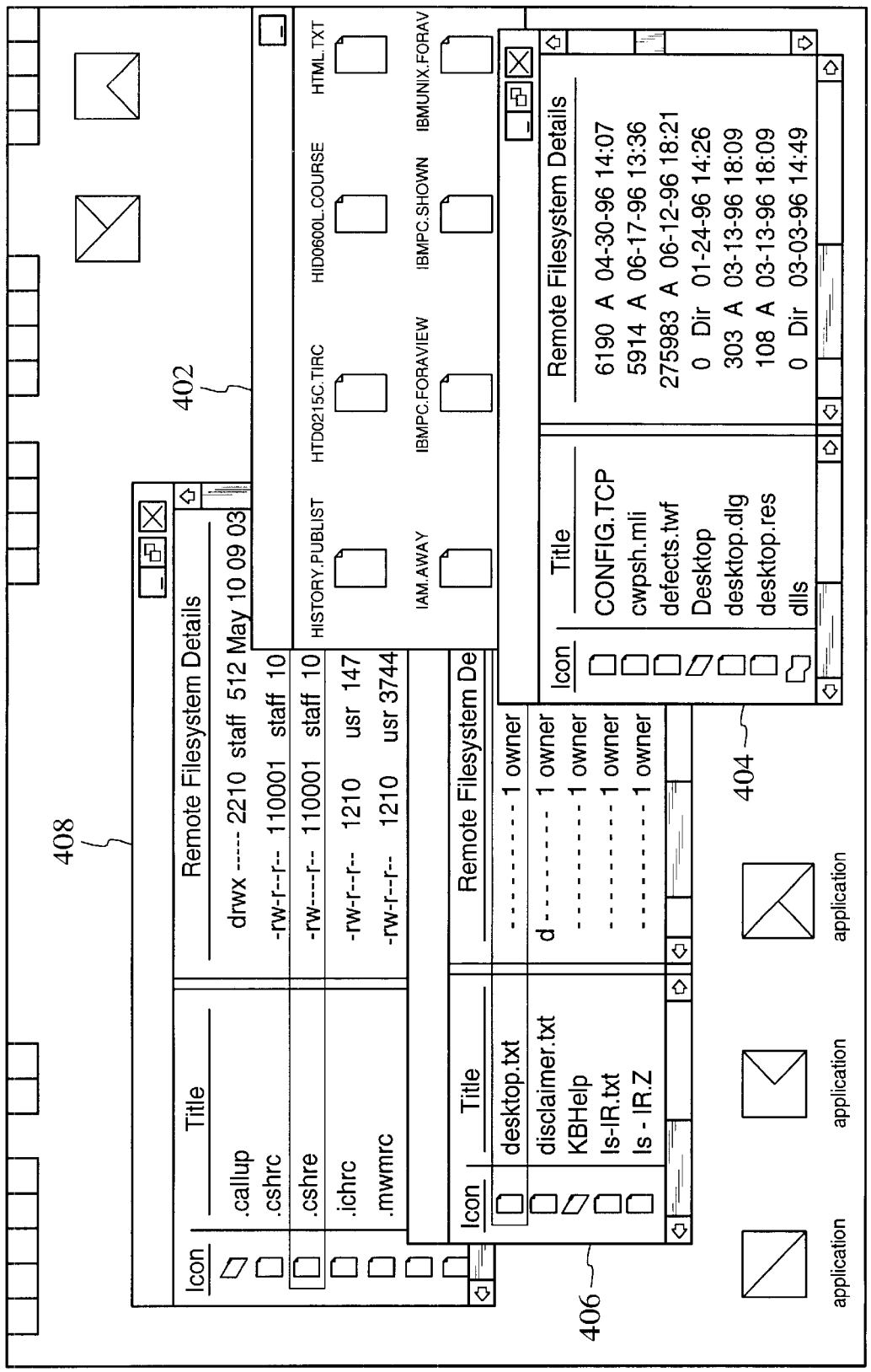
FIG. 6 shows four open FTP Host views of four different hosts running 4 different operating systems—a VM host an OS/2 host, a Windows NT host, and a UNIX host.

Remote hosts may be running any operating system that supports an FTP server. For this reason, on the client, the FTP Host folder provides folder-based views of directories and files that exist on remote hosts running UNIX, VM, Windows NT, OS/2 Warp, or other operating systems—right alongside folder-based views of directories and files that reside on the local machine. FIG. 6 shows four open FTP Host views—a VM host 402, an OS/2 host 404, a Windows NT host 406, and a UNIX host 408. In a preferred embodiment, all of the data on these heterogenous systems are seamlessly viewable and manipulable.

Once a view of an FTP Host is opened, files can be transferred. The files to be transferred are selected with the mouse, and then are either dragged to the desktop or other folder to perform a get operation from the host, or a file is dragged from the desktop or other folder to the host to perform a put operation.

If the drag is performed from the remote host directly (i.e., without using the remote file object's "Get . . ." popup menu items), no prompts or progress indicators will be visible. If, however, the get operation is initiated from the remote file object's "Get . . ." popup menu item, then the standard Workplace Shell progress dialog will be visible. The "Get . . ." popup menu option also allows the user to use the Workplace Shell's built-in target resolution dialog to pick up the target folder for the get operation, just as with any other menu-initiated operation on an object. An mget or mput operation can be performed by selecting multiple files for the operation.

When get and put operations are performed, the default transfer mode (either binary or ASCII) that is currently specified for the host is used. This value can be toggled from the FTP Host folder's context menu or from its Properties notebook.

Files can be directly transferred between two open FTP Host folders that reside either on the same host or different hosts. This "proxy put" uses an FTP service that transfers the files without involving the local client When proxy puts are performed, the transfer mode used is the target host; however, if the two hosts involved in a proxy put specify different, incompatible, default transfer modes, the transfer should be performed in two steps, first by dragging the desired file from one host to the desktop, then dragging the resulting file to the second host.

In addition, if the appropriate access is granted, files can be deleted on the remote host either by selecting the "Delete from host . . ." context menu option on the remote file object or by dragging and dropping the remote file object onto the Shredder.

Other FTP Host Operations

Other operations which could be provided on an FTP Host folder are pinging, querying the remote host's operating system, and querying the remote host's present working directory. These operations can be selected from the remote host folder's context menu. The output of the ping operation estimates the access time to the host in KBytes per second transferred; that number indicates how long it will take to transfer given files to and from the host.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for accessing a remote host using a user interface for a processing system comprising the steps of:
    a) identifying a plurality of programming interface operations for the remote host; and
    b) mapping a user interface code to the programming interface operations to allow for the user interface to be utilized when accessing the remote host.

2. The method of claim 1 wherein the user interface comprises a windows-like environment.

3. The method of claim 2 wherein the mapping step (b) comprises the step of utilizing a dynamic link library to map the user interface code to the programming interface code.

4. The method of claim 3 wherein the mapping step (b) comprises the step of accessing command line detail input from the user interface interactions based upon the user interface code.

5. The method of claim 4 wherein the user interface interactions comprise a double click, open, pop up menu and drag a file.

6. The method of claim 5 wherein the remote host is a File Transfer Protocol (FTP) remote host.

7. The method of claim 6 which further comprises the step (c) of providing a FTP host folder.

8. The method of claim 7 wherein the FTP host folder comprises a plurality of files.

9. The method of claim 8 wherein the FTP host folder further comprises a folder based view of directories and files existing on a plurality of remote hosts.

10. The method of claim 8 wherein the FTP host folder further comprises a folder based view of directories and files existing on one remote hosts.

11. A method accessing a remote host using a user interface for a processing system; the remote host having a programming interface code for providing programming interface operations; the method comprising the steps of:
    (a) allowing user interface operations to correspond to the programming interface through the use of a mapping code; and
    (b) utilizing the mapping code to map the user interface code to the programming interface operations when accessing the remote host.

12. The method of claim 11 wherein the user interface comprises a windows-like environment.

13. The method of claim 12 wherein the utilizing step (b) comprises utilizing a dynamic link library to map the user interface code to the programming interface code.

14. The method of claim 13 wherein the utilizing step comprises the mapping code accessing command line detail input from user interface interactions based upon the user interface code.

15. The method of claim 14 wherein the command line detail comprises a double click, open, pop up menu and drag a file operations.

16. The method of claim 15 wherein the remote host is a File Transfer Protocol (FTP) remote host.

17. The method of claim 16 which further comprises the step (c) of providing a FTP host folder.

18. The method of claim 17 wherein the FTP host folder comprises a plurality of files.

19. The method of claim 18 wherein the FTP host folder further comprises a folder based view of directories and files existing on a plurality of remote hosts.

20. The method of claim 18 wherein the FTP host folder further comprises a folder based view of directories and files existing on one remote hosts.

21. A system for accessing a remote host using a user interface for a processing system comprising:

means for identifying a plurality of programming interface operations for the remote host; and means for mapping a user interface code to the programming interface operations to allow for the user interface to be utilized when accessing the remote host.

22. The system of claim 21 wherein the user interface comprises a windows-like environment.

23. The system of claim 22 wherein the mapping means comprises means for utilizing a dynamic link library to map the user interface code to the programming interface code.

24. The system of claim 23 wherein the mapping means comprises means for accessing command line detail input from the user interface code.

25. The system of claim 24 wherein the command line detail comprises a double click, open, pop up menu and drag a file.

26. The system of claim 25 wherein the remote host is a File Transfer Protocol (FTP) remote host.

27. The system of claim 26 which further comprises the step (c) of providing a FTP host folder.

28. The system of claim 27 wherein the FTP host folder comprises a plurality of files.

29. The system of claim 28 wherein the FTP host folder further comprises a folder based view of directories and files existing on a plurality of remote hosts.

30. The system of claim 28 wherein the FTP host folder further comprises a folder based view of directories and files existing on one remote hosts.

31. A computer readable medium containing program instructions for accessing a remote host using a user interface for a processing system; the remote host having a programming interface code for providing programming interface operations; the program instructions comprising:

(a) allowing user interface operations to correspond to the programming interface through the use of a mapping code; and (b) utilizing the mapping code to map the user interface code to the programming interface operations when accessing the remote host.

* * * * *

UNITED STATES PATENT AND TRADEMARK OFFICE
CERTIFICATE OF CORRECTION

PATENT NO. : 6,407,752 B1
DATED : June 18, 2002
INVENTOR(S) : Harnett

It is certified that error appears in the above-identified patent and that said Letters Patent is hereby corrected as shown below:

Column 6,
Lines 55-67, claims 10 and 11 should read as follows:
    10. The method of claim 8 wherein the FTP host folder further comprises a folder based view of directories and filed existing on one remote host.

11. A method for accessing a remote host using a user interface for a processing system, the method comprising the steps of:

(a) allowing user interface operations of correspond to the programming interface code through the use of a mapping code; and (b) utilizing the mapping code to map the user interface operations to the programming interface operations when accessing the remote host.

Column 7,
Lines 22-24, claim 20 should read as follows:
    20. The method of claim 18 wherein the FTP host folder further comprises a folder based view of directories and filed existing on one remote host.

UNITED STATES PATENT AND TRADEMARK OFFICE
CERTIFICATE OF CORRECTION

PATENT NO. : 6,407,752 B1
DATED : June 18, 2002
INVENTOR(S) : Harnett

It is certified that error appears in the above-identified patent and that said Letters Patent is hereby corrected as shown below:

<u>Column 8,</u>
Lines 19-32, claims 30 and 31 should read as follows:
    30. The method of claim 28 wherein the FTP host folder further comprises a folder based view of directories and filed existing on one remote host.
    31. A computer readable medium containing program instructions for accessing a remote host using a user interface for a processing system; the remote host having a programming interface code for providing programming interface operations; the program instructions comprising:

(a) allowing usert interface operations to correspond to the programming interface code through the use of a mapping code; and (b) utilizing the mapping code to map the user interface operations to the programming interface operations when accessing the remote host.

Signed and Sealed this

Twentieth Day of May, 2003

JAMES E. ROGAN
*Director of the United States Patent and Trademark Office*